(12) United States Patent
Kim et al.

(10) Patent No.: US 8,927,141 B2
(45) Date of Patent: Jan. 6, 2015

(54) RECHARGEABLE BATTERY

(75) Inventors: Hyo-Seob Kim, Yongin-si (KR); Chun-Mo Yang, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 669 days.

(21) Appl. No.: 12/841,088

(22) Filed: Jul. 21, 2010

(65) Prior Publication Data

US 2011/0091752 A1 Apr. 21, 2011

(30) Foreign Application Priority Data

Oct. 16, 2009 (KR) .......... 10-2009-0098890

(51) Int. Cl.
| | |
|---|---|
| *H01M 2/12* | (2006.01) |
| *H01M 2/14* | (2006.01) |
| *H01M 2/18* | (2006.01) |
| *H01M 2/00* | (2006.01) |
| *H01M 2/08* | (2006.01) |
| *H01M 2/06* | (2006.01) |
| *H01M 2/02* | (2006.01) |
| *H01M 2/10* | (2006.01) |
| *H01M 2/04* | (2006.01) |
| *H01M 10/42* | (2006.01) |
| *H01M 2/36* | (2006.01) |

(52) U.S. Cl.
CPC .......... *H01M 2/1247* (2013.01); *H01M 2/1264* (2013.01); *H01M 2/0456* (2013.01); *H01M 10/4235* (2013.01); *H01M 2/36* (2013.01); *H01M 2/18* (2013.01); *H01M 2/0443* (2013.01)
USPC ............. 429/186; 429/82; 429/129; 429/146; 429/163; 429/175; 429/176; 429/179

(58) Field of Classification Search
None
See application file for complete search history.

(56) References Cited

U.S. PATENT DOCUMENTS

| | | | | |
|---|---|---|---|---|
| 3,085,127 | A | * 4/1963 | Loris | ................................ 429/99 |
| 4,055,711 | A | * 10/1977 | Ikari | .............................. 429/143 |
| 5,178,973 | A | 1/1993 | Binder et al. | |
| 6,143,440 | A | 11/2000 | Volz et al. | |

(Continued)

FOREIGN PATENT DOCUMENTS

| | | |
|---|---|---|
| CN | 2773913 Y | 4/2006 |
| CN | 101540381 A | 9/2009 |

(Continued)

OTHER PUBLICATIONS

Examiner Annotated Figure 1 of Eo.*
Japanese Office action dated Sep. 18, 2012 issued in corresponding Japanese Patent Application No. 2010-133269, 3 pages.

(Continued)

*Primary Examiner* — Ula C. Ruddock
*Assistant Examiner* — Matthew Van Oudenaren
(74) *Attorney, Agent, or Firm* — Christie, Parker & Hale, LLP (57) ABSTRACT

A rechargeable battery includes an electrode assembly having a positive electrode, a negative electrode, and a separator located between the positive electrode and the negative electrode; a case housing the electrode assembly, the case having an opening; a cap assembly including a cap plate coupled to the opening of the case and a vent member on the cap plate adapted to discharge a gas from the case; and a separation member located between the electrode assembly and the cap plate to prevent the electrode assembly from significantly moving toward the cap plate.

14 Claims, 7 Drawing Sheets

(56) References Cited

U.S. PATENT DOCUMENTS

| | | | |
|---|---|---|---|
| 2002/0122974 A1* | 9/2002 | Kim | 429/54 |
| 2004/0126650 A1 | 7/2004 | Kim | |
| 2004/0170887 A1 | 9/2004 | Masumoto et al. | |
| 2005/0058895 A1* | 3/2005 | Aamodt | 429/142 |
| 2006/0099494 A1* | 5/2006 | Jung et al. | 429/72 |
| 2006/0117701 A1 | 6/2006 | Kajimura | |
| 2006/0127755 A1* | 6/2006 | Cho | 429/174 |
| 2009/0263703 A1 | 10/2009 | Kim | |

FOREIGN PATENT DOCUMENTS

| | | |
|---|---|---|
| EP | 0 981 173 A1 | 2/2000 |
| EP | 2 104 159 A1 | 9/2009 |
| EP | 2 254 176 A1 | 11/2010 |
| JP | 61-250974 | 11/1986 |
| JP | 07-288122 | 10/1995 |
| JP | 09-320551 | 12/1997 |
| JP | 11-025993 | 1/1999 |
| JP | 2004-030946 | 1/2004 |
| JP | 2004-119383 | 4/2004 |
| JP | 2004-319101 | 11/2004 |
| JP | 2005-267945 | 9/2005 |
| JP | 2006-147422 | 6/2006 |
| JP | 2009-224319 | 10/2009 |
| KR | 10-0571227 | 4/2006 |
| KR | 10-0614389 | 8/2006 |
| KR | 10-2006-0064540 * | 1/2008 |
| KR | 10-2009-0099241 A | 9/2009 |

OTHER PUBLICATIONS

European Search Report dated Dec. 21, 2010, for corresponding European Patent application 10182940.6. noting listed references in this IDS.
Patent Abstracts of Japan and English machine translatjon of Japanese Publication 2005-267945 listed above, 14 pages.
Patent Abstracts of Japan and English translation of JP 2004-030946, 6 pps.
KIPO Office action dated Feb. 17, 2011 in priority Korean patent application No. 10-2009-0098890, 4 pps.
Korean Office Action dated May 18, 2012 issued in Priority Application No. 10-2009-0098890, 6 pages.
European Patent Office Office action dated Jul. 7, 2011 issued to corresponding application No. EP 10-182-940.6-2119, 4 pages.
European Patent Office action dated Sep. 13, 2011, for corresponding European patent application No. 10182940.6, 4 pps.
Chinese Office action dated Jan. 4, 2013 issued to corresponding application No. CN201010290488.8, 7 pages.
English translation of Chinese Office action dated Jan. 4, 2013, 6 pages.
SIPO Office action dated Aug. 26, 2013, with English translation, for corresponding Chinese Patent application 201010290488.8, (20 pages).
JPO Notice of Allowance dated Jun. 18, 2013, for corresponding Japanese Patent application 2010-133269, (3 pages).
Patent Abstracts of Japan, and English machine translation of Japanese Publication 09-320551 dated Dec. 12, 1997, listed above, (9 pages).

* cited by examiner

RECHARGEABLE BATTERY

CROSS-REFERENCE TO RELATED APPLICATION

This application claims priority to and the benefit of Korean Patent Application No. 10-2009-0098890 filed in the Korean Intellectual Property Office on Oct. 16, 2009, the entire content of which is incorporated herein by reference.

BACKGROUND

1. Field

The described technology relates generally to a rechargeable battery.

2. Description of Related Art

A rechargeable battery can be repeatedly charged and discharged, unlike a primary battery that cannot be recharged. A low capacity rechargeable battery is used as a power source for a small portable electronic device, such as a mobile phone, a laptop computer, and a camcorder, and a large capacity rechargeable battery is widely used as a power source for driving a motor, such as for a hybrid vehicle.

Currently, a high power rechargeable battery using a high energy density non-aqueous electrolyte has been developed, and such a high power rechargeable battery is formed with a large capacity by coupling a plurality of rechargeable batteries in series in order to drive a motor of an appliance that needs a large amount of electric power, for example, an electric vehicle.

Further, a large capacity rechargeable battery is generally formed with a plurality of rechargeable batteries that are coupled in series, and the rechargeable battery can be formed in a cylindrical shape or a square shape.

The square rechargeable battery includes an electrode assembly in which a positive electrode and a negative electrode are positioned with a separator located therebetween, a case having a space that houses the electrode assembly, a cap plate that closes and seals the case and in which a terminal hole for inserting a terminal is formed, wherein the terminal is electrically connected to the electrode assembly and is inserted into the terminal hole to protrude to the outside of the case.

If excessive heat is present or if an electrolyte solution is decomposed within a rechargeable battery, internal pressure thereof rises, so a vent fracturable at a predetermined pressure is installed in order to prevent explosion of the battery. In order to stably discharge gas through the vent, sufficient space should be formed between the vent and the electrode assembly. However, when gas is discharged, due to a discharge pressure of the gas, the electrode assembly may rise together with the gas, thereby blocking the vent hole. When the gas is not discharged due to the electrode assembly blocking the vent hole, the internal pressure of the rechargeable battery increases and thus the rechargeable battery may explode.

The above information disclosed in this Background section is only for enhancement of understanding of the background of the described technology and therefore it may contain information that does not form the prior art that is already known in this country to a person of ordinary skill in the art.

SUMMARY

The described technology has been made to generally provide a rechargeable battery having improved safety.

An exemplary embodiment of the present invention provides a rechargeable battery including an electrode assembly having a positive electrode, a negative electrode, and a separator located between the positive electrode and the negative electrode; a case housing the electrode assembly, the case having an opening; a cap assembly including a cap plate coupled to the opening of the case and a vent member on the cap plate adapted to discharge a gas from the case; and a separation member located between the electrode assembly and the cap plate to prevent the electrode assembly from significantly moving toward the cap plate.

In one embodiment, the separation member comprises at least one support plate fixed to the cap assembly and an interception plate fixed to the support plate and generally aligned with the vent member, wherein the support plate protrudes from the interception plate to separate the interception plate from the cap plate. In one embodiment, the interception plate contacts the electrode assembly and may be oriented substantially parallel to the cap plate.

Additionally, in one embodiment, a longitudinal axis of the interception plate extends in a substantially parallel direction to a longitudinal axis of the cap plate, and two support plates are attached at side edges of the interception plate such that the two support plates extend substantially parallel to each other. Further, the interception plate may have an escape groove positioned to be generally aligned with an electrolyte injection opening on the cap plate. In one embodiment, the interception plate comprises a porous material.

In one embodiment, the support plate contacts the cap plate. Additionally, the cap assembly includes a terminal exposed to the outside and a lower gasket fixed to the terminal, and the separation member is attached to the lower gasket. Further, the separation member may be integral with the lower gasket.

In one embodiment, the cap assembly includes two terminals each exposed to the outside and two lower gaskets, each of the lower gaskets fixed to one of the terminals, and the separation member is positioned between the two lower gaskets to be integral with the lower gaskets. In exemplary embodiments, the separation member has a bent vent escape portion generally aligned with the vent member and a bent electrolyte escape portion generally aligned with the electrolyte injection opening.

DESCRIPTION OF REFERENCE NUMERALS INDICATING PRIMARY ELEMENTS IN THE DRAWINGS

| | |
|---|---|
| 100: rechargeable battery | 10: electrode assembly |
| 11: positive electrode | 12: negative electrode |
| 13: separator | 20: cap assembly |
| 21: positive terminal | 21a, 22a: terminal flange |
| 22: negative terminal | 25: upper gasket |
| 26, 65, 67, 75, 85, 87: lower gasket | |
| 27: electrolyte injection opening | 29: nut |
| 20: cap assembly | 30: cap plate |
| 34: case | 39: vent member |
| 40, 50, 60, 70, 80, 90, 120, 130: separation member | |
| 41, 42, 51, 52, 61, 62, 71, 72, 81, 82, 121, 124, 131, 132: support plate | |
| 43, 53, 63, 73, 83, 125, 135: interception plate | |
| 43a, 54, 56: escape groove | 81a, 82a: protrusion |
| 85a, 87a: fixing groove | 91, 92: support portion |
| 94: electrolyte escape portion | 96: vent escape portion |
| 131a, 132a: bent portion | 134: escape groove |
| 135: interception plate | |

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification and the drawings.

Figure 1:
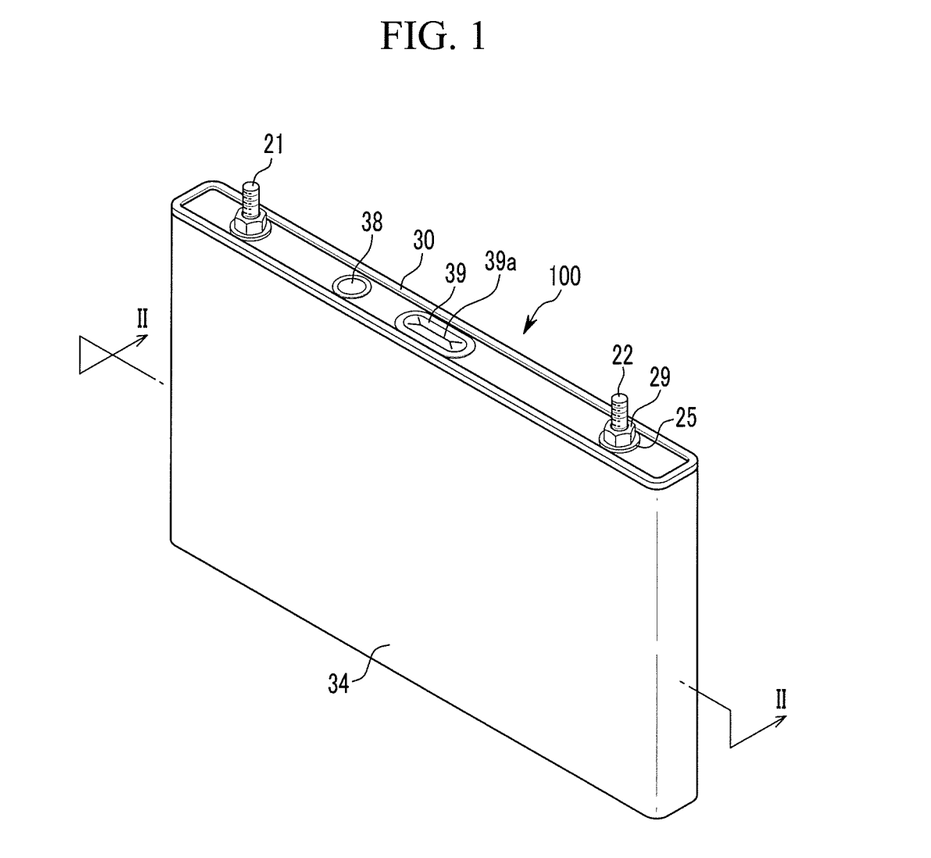
FIG. 1 is a perspective view illustrating a rechargeable battery according to a first exemplary embodiment of the present invention.
Figure 2:
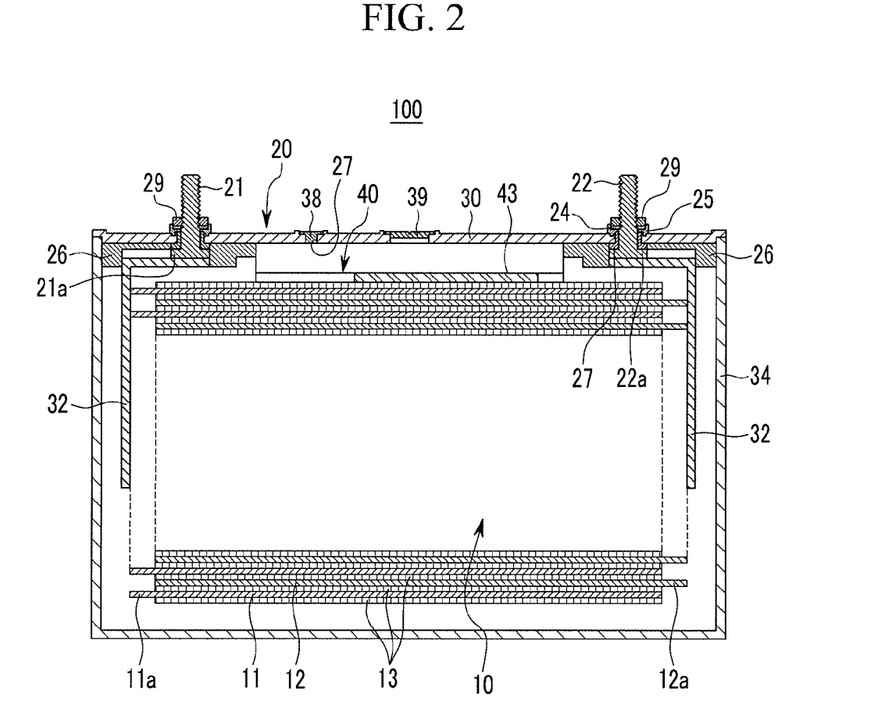
FIG. 2 is a cross-sectional view of the rechargeable battery taken along line II-II of FIG. 1.

FIG. 1 is a perspective view illustrating a rechargeable battery according to a first exemplary embodiment of the present invention, and FIG. 2 is a cross-sectional view of the rechargeable battery taken along line II-II of FIG. 1.

Referring to FIGS. 1 and 2, a rechargeable battery 100 according to the present exemplary embodiment includes an electrode assembly 10 that is spiral-wound by locating a separator 13 between a positive electrode 11 and a negative electrode 12, a case 34 that houses the electrode assembly 10, and a cap assembly 20 that is coupled to an opening of the case 34.

The rechargeable battery 100 according to the present exemplary embodiment is illustrated as a square-shaped lithium ion rechargeable battery. However, the present invention is not limited thereto, and the present invention can be applied to various forms of batteries such as a lithium polymer battery or a cylindrical battery.

The positive electrode 11 and the negative electrode 12 include a coating region, which is an area in which an active material is coated in a current collector that is formed with a thin plate of metal foil, and uncoated regions 11a and 12a, which are areas on which an active material is not coated.

The positive uncoated region 11a is formed at one side end in a length direction of the positive electrode 11, and the negative uncoated region 12a is formed at the other side end in a length direction of the negative electrode 12. The positive electrode 11 and the negative electrode 12 contact a separator 13, which is an insulator, therebetween, and they are spiral-wound together.

However, the present invention is not limited thereto, and the electrode assembly 10 may be formed in a structure in which a positive electrode and a negative electrode that are formed with a plurality of sheets are stacked with a separator located therebetween.

The case 34 is formed to be approximately cuboid, and includes an open end. The cap assembly 20 includes a cap plate 30 that covers an opening of the case 34, a positive terminal 21 that protrudes to the outside of the cap plate 30 and that is electrically connected to the positive electrode 11, a negative terminal 22 that protrudes to the outside of the cap plate 30 and that is electrically connected to the negative electrode 12, and a vent member 39 in which a notch 39a is formed to be ruptured at a predetermined internal pressure.

The cap plate 30 is formed as a thin plate and has an electrolyte injection opening 27 for injecting an electrolyte solution on one side thereof and a seal stopper 38 that seals the electrolyte injection opening 27 fixed thereto.

An upper gasket 25 is installed between the cap plate 30 and the terminals 21 and 22 to insulate the cap plate 30 from the terminals 21 and 22. In the present specification, the terminals 21 and 22 are the positive terminal 21 and the negative terminal 22. The upper gasket 25 is inserted into a terminal hole and is formed as two pieces to be positioned closely adjacent to each of an upper part and a lower part of the terminal hole.

The terminals 21 and 22 are formed in a circular cylinder shape. A nut 29 that supports the terminals 21 and 22 at an upper part is installed at the terminals 21 and 22, and a screw thread is formed to fasten the nut 29 at an external circumference of the terminals 21 and 22. Terminal flanges 21a and 22a that support the terminals 21 and 22 at a lower part thereof are formed at a lower end of the terminals 21 and 22.

A lower gasket 26 for insulation is installed between the terminal flanges 21a and 22a and the cap plate 30. A lead member 32 that is electrically connected to each of the positive electrode and the negative electrode, respectively, is attached by welding to the terminal flanges 21a and 22a, and the terminal flanges 21a and 22a and the lead member 32 are inserted into a groove that is formed in the lower gasket 26. In this case, the lower gasket 26 is inserted between the terminal flanges 21a and 22a and the cap plate 30 to be stably fixed.

A separation member 40 is installed between the lower gaskets 26 that are positioned at both sides such that the electrode assembly 10 may be positioned and maintained at a sufficient distance from the cap plate 30, even when a force pushing the electrode assembly toward the cap plate is applied to the electrode assembly.

Figure 3:
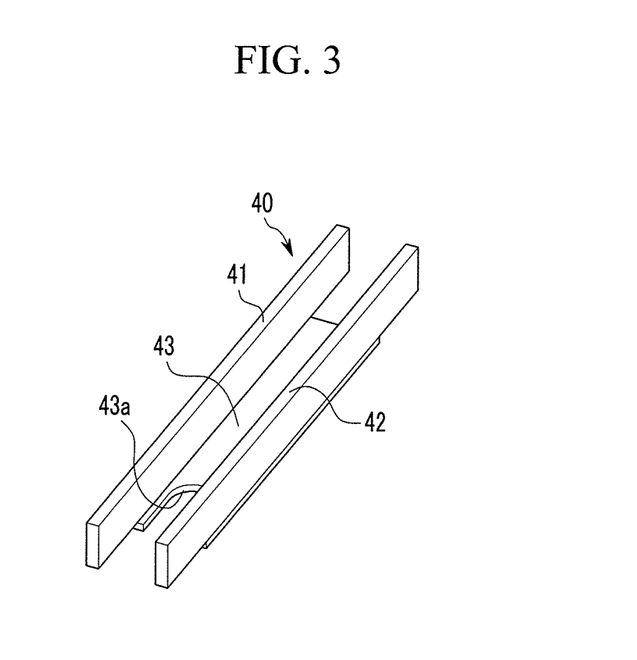
FIG. 3 is a perspective view illustrating a separation member of the rechargeable battery according to the first exemplary embodiment of the present invention.

FIG. 3 is a perspective view illustrating a separation member of the rechargeable battery according to the first exemplary embodiment of the present invention.

Referring to FIG. 3, the separation member 40 according to the present exemplary embodiment includes an interception plate 43 that is installed substantially parallel to the cap plate 30, and support plates 41 and 42 that are installed at both side edges of the interception plate 43 to fix the separation member 40 to the lower gasket 26.

The support plates 41 and 42 are installed substantially perpendicular to the interception plate 43 at respective sides of the interception plate 43, and both ends of a length direction thereof are attached to the lower gasket 26. The support plates 41 and 42 protrude toward the cap plate 30 further than the interception plate 43 to separate the interception plate 43 from the cap plate 30.

An area between the support plates 41 and 42 is opened, and thus gas can move through the space between the support plates 41 and 42. Further, because a portion in which the interception plate 43 creates an opening at a lower end between the support plates 41 and 42, gas can move from a lower part through the separation member.

The interception plate 43 has an escape groove 43a, and the escape groove 43a is formed under and generally aligned with the electrolyte injection opening 27 to allow an electrolyte solution to be easily injected into the rechargeable battery. Further, the interception plate 43 is positioned under the vent member 39.

When the separation member 40 is installed between the cap plate 30 and the electrode assembly 10, a space between the cap plate 30 and the electrode assembly 10 can be prevented from being reduced due to the separation member preventing movement of the electrode assembly 10 toward the cap plate, and when the vent member 39 is opened, a discharge passage of gas can be easily secured. Gas can be freely discharged through the space that is formed by the interception plate 43 and the support plates 41 and 42.

Further, because the separation member 40 is fixed to the lower gasket 26, the separation member 40 can be easily fixed to the cap assembly 20, and when gas is discharged, impurities such as an electrolyte solution can be prevented from being discharged to the outside.

Further, an upper end of each of the support plates 41 and 42 is installed to contact a lower surface of the cap plate 30, and the interception plate 43 is installed to contact the electrode assembly that is positioned under the interception plate 43. Accordingly, when the vent member 39 is opened, the support plates 41 and 42 stably support a rising pressure of the electrode assembly 10 and thus the support plates 41 and 42 prevent the electrode assembly 10 from rising, and the interception plate 43 prevents the electrode assembly 10 from vibrating due to an external impact.

Figure 4:
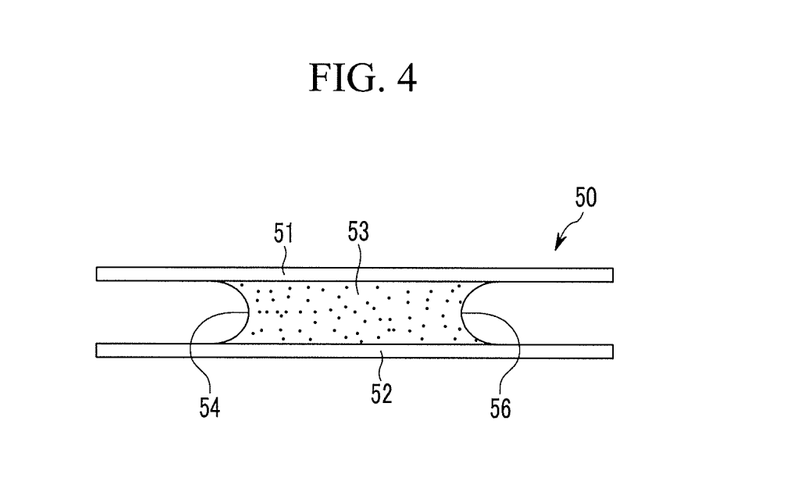
FIG. 4 is a top plan view illustrating a separation member of a rechargeable battery according to a second exemplary embodiment of the present invention.

FIG. 4 is a top plan view illustrating a separation member 50 of a rechargeable battery according to a second exemplary embodiment of the present invention.

The rechargeable battery according to the present exemplary embodiment has substantially the same configuration as that of the rechargeable battery according to the first exemplary embodiment, except for a configuration of a separation member, and therefore a detailed description thereof will be omitted.

Referring to FIG. 4, the separation member 50 according to the present exemplary embodiment includes an interception plate 53 that is oriented substantially parallel to the cap plate 30, and support plates 51 and 52 that are installed at both side ends of the interception plate 53. Both ends of the support plate 51 and 52 are fixed to the lower gasket 26, and an upper end thereof contacts a lower surface of the cap plate 30.

The interception plate 53 is made of a porous material and is installed parallel to the cap plate 30. Accordingly, gas can be discharged through the interception plate 53 as well as through the space between the support plates 51 and 52 and the interception plate 53. For example, the porous material may be one of PolyPropylene(PP), PolyButylene Terephthalate(PBT) and PolyPhenylene Sulfide(PPS).

In the interception plate 53, escape grooves 56 that are curved in an arc shape are formed at both edges of a length direction. The escape grooves 56 prevent the interception plate 53 from being positioned under and blocking the electrolyte injection opening and allow gas to easily move to the vent member 39. Because the escape grooves 56 provide an open space at a lower end of the separation member 50 between the support plates 51 and 52, gas can be more easily moved through the separation member. Further, because the support plates 51 and 52 are connected to the lower gasket 26 even at a portion to which the interception plate 53 does not extend, the support plates 51 and 52 can support the electrode assembly 10.

In the present exemplary embodiment, by forming the escape grooves 56 at both sides of the interception plate 53, a discharge distance of gas through the vent member 39 is minimized.

Figure 5:
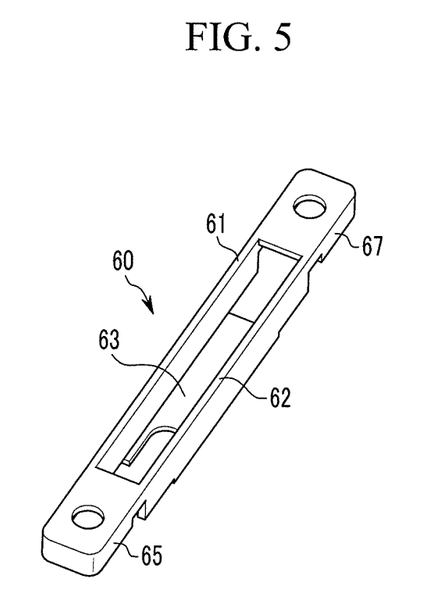
FIG. 5 is a perspective view illustrating a separation member of a rechargeable battery according to a third exemplary embodiment of the present invention.

FIG. 5 is a perspective view illustrating a separation member of a rechargeable battery according to a third exemplary embodiment of the present invention.

The rechargeable battery according to the present exemplary embodiment has substantially the same configuration as that of the rechargeable battery according to the first exemplary embodiment, except for a configuration of a separation member, and therefore a detailed description thereof will be omitted.

Referring to FIG. 5, a separation member 60 according to the present exemplary embodiment includes lower gaskets 65 and 67 that are installed at both ends of a length direction, support plates 61 and 62 that are installed between the lower gaskets 65 and 67 and that connect the lower gaskets 65 and 67, and an interception plate 63 that is installed at a lower end of the support plates 61 and 62.

The interception plate 63 is attached to a lower surface of the support plates 61 and 62, and the support plates 61 and 62 are integrally formed with the two lower gaskets 65 and 67. When the support plates 61 and 62 and the lower gaskets 65 and 67 are integrally formed, as in the present exemplary embodiment, even if the separation member 60 is not separately attached, the support plates 61 and 62 and the lower gaskets 65 and 67 can be stably fixed to the cap plate.

Figure 6:
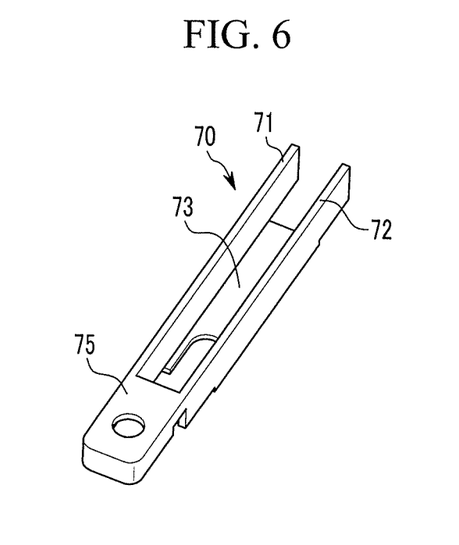
FIG. 6 is a perspective view illustrating a separation member of a rechargeable battery according to a fourth exemplary embodiment of the present invention.

FIG. 6 is a perspective view illustrating a separation member of a rechargeable battery according to a fourth exemplary embodiment of the present invention.

The rechargeable battery according to the present exemplary embodiment has substantially the same configuration as that of the rechargeable battery according to the first exemplary embodiment, except for a configuration of a separation member, and therefore a detailed description thereof will be omitted.

Referring to FIG. 6, a separation member 70 according to the present exemplary embodiment includes a lower gasket 75 that is integrally formed at one side end portion thereof, support plates 71 and 72 that are integrally fixed to the lower gasket 75, and an interception plate 73 that is installed to a lower end of the support plates 71 and 72.

In the separation member 70 according to the present exemplary embodiment, the lower gasket 75 is integrally formed at only one side end portion thereof, and the separation member 70 is fixed to a lower gasket that is separately formed without being integrally formed with the lower gasket at the other side end portion thereof.

When the lower gasket 75 is integrally formed at one end portion of the separation member 70, as in the present exemplary embodiment, even if the separation member 70 is not separately fixed, the separation member 70 can be stably fixed to the cap assembly.

Figure 7:
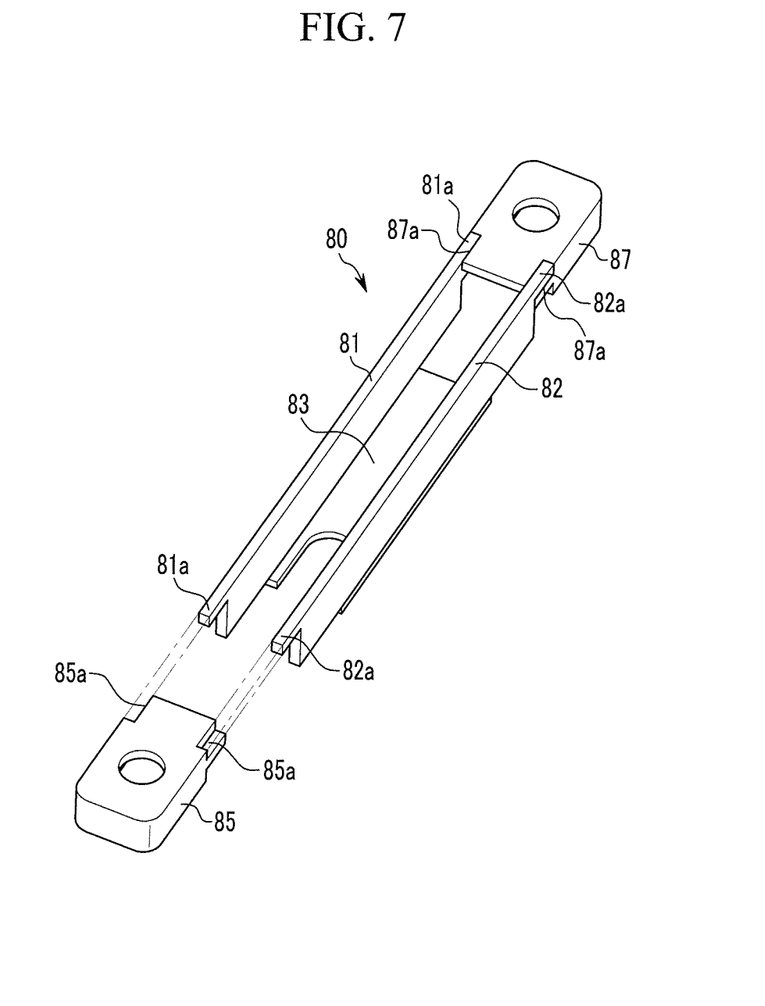
FIG. 7 is a perspective view illustrating a separation member of a rechargeable battery according to a fifth exemplary embodiment of the present invention.

FIG. 7 is a perspective view illustrating a separation member of a rechargeable battery according to a fifth exemplary embodiment of the present invention.

The rechargeable battery according to the present exemplary embodiment has substantially the same configuration as that of the rechargeable battery according to the first exemplary embodiment, except for a configuration of a separation member, and therefore a detailed description thereof will be omitted.

Referring to FIG. 7, a separation member 80 according to the present exemplary embodiment has protrusions 81a and 82a that are inserted into lower gaskets 85 and 87 at both ends of a length direction.

The separation member 80 includes an interception plate 83 and two support plates 81 and 82 that are installed at both side ends of the interception plate 83, and the protrusions 81a and 82a are formed at both ends of a length direction of the support plates 81 and 82.

Fixing grooves 85a and 87a into which the protrusions 81a and 82a are inserted are formed on the lower gaskets 85 and 87, and the fixing grooves 85a and 87a are formed at both side ends of an upper surface of the lower gaskets 85 and 87. Such fixing grooves 85a and 87a are opened at a surface toward the support plates 81 and 82, and have blocked lower parts. Accordingly, when the protrusions 81a and 82a are inserted into the fixing grooves 85a and 87a, the separation member 80 is prevented from moving under the lower gaskets 85 and 87 and can be stably fixed by the lower gaskets 85 and 87.

Figure 8:
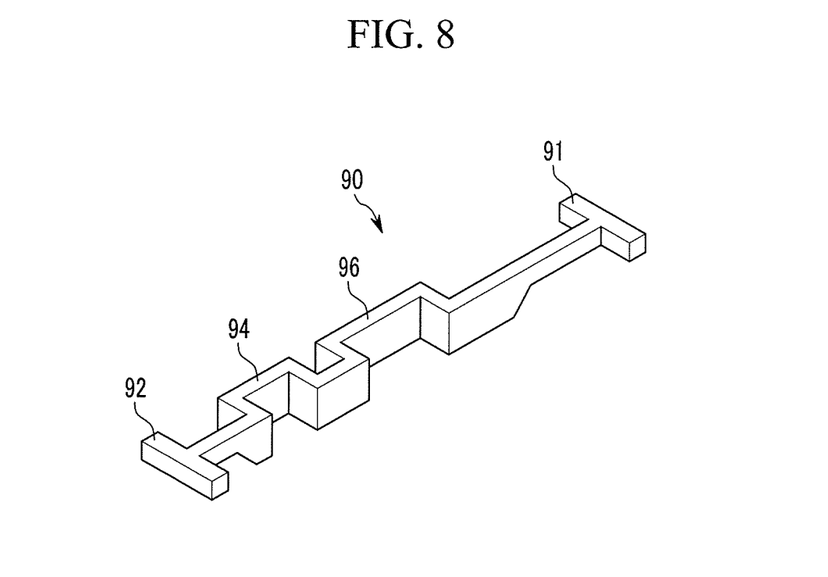
FIG. 8 is a perspective view illustrating a separation member of a rechargeable battery according to a sixth exemplary embodiment of the present invention.
Figure 9:
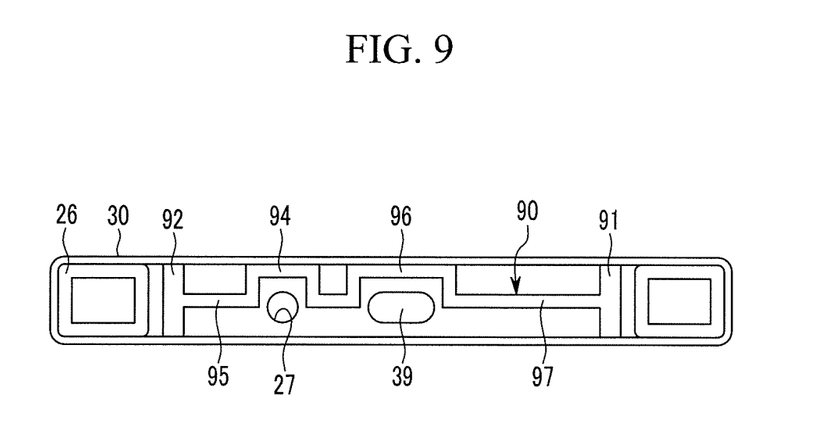
FIG. 9 is a bottom view illustrating a state where the separation member according to the sixth exemplary embodiment of the present invention is installed on a cap assembly.

FIG. 8 is a perspective view illustrating a separation member of a rechargeable battery according to a sixth exemplary embodiment of the present invention, and FIG. 9 is a bottom view illustrating a state where the separation member according to the sixth exemplary embodiment of the present invention is installed at a cap assembly.

The rechargeable battery according to the sixth exemplary embodiment has substantially the same configuration as that of the rechargeable battery according to the first exemplary embodiment, except for a configuration of a separation member, and therefore a detailed description thereof will be omitted.

Referring to FIGS. 8 and 9, a separation member 90 according to the present exemplary embodiment is formed in a bar shape, and a thickness of a central portion thereof is greater than a thickness of an edge thereof.

When the thickness of a central portion of the separation member 90 is formed to be large, by separating the cap plate 30 and the electrode assembly 10, the electrode assembly 10 can be prevented from significantly rising upward.

The separation member 90 includes support portions 91 and 92 that are positioned at both ends and that are fixed to the lower gasket 26, an electrolyte escape portion 94 that is positioned under the electrolyte injection opening 27 and that is bent toward a wall surface of the case 34, and a vent escape portion 96 that is positioned under the vent member 39 and that is bent toward a wall surface of the case 34.

When the separation member 90 is formed in a bar shape, and a bent electrolyte escape portion 94 and a vent escape portion 96 are formed in the separation member 90, the separation member 90 can be stably prevented from interfering with opening of the vent member 39 and discharging gas as well as injection of an electrolyte solution through the electrolyte injection opening 27.

Figure 10:
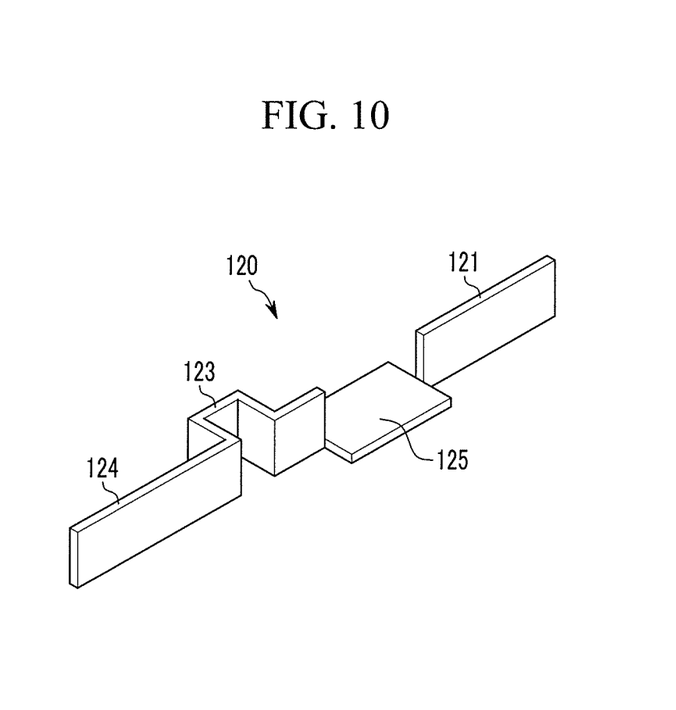
FIG. 10 is a perspective view illustrating a separation member of a rechargeable battery according to a seventh exemplary embodiment of the present invention.

FIG. 10 is a perspective view illustrating a separation member of a rechargeable battery according to a seventh exemplary embodiment of the present invention.

The rechargeable battery according to the present exemplary embodiment has substantially the same configuration as that of the rechargeable battery according to the first exemplary embodiment, except for a configuration of a separation member, and therefore a detailed description thereof will be omitted.

Referring to FIG. 10, a separation member 120 according to the present exemplary embodiment includes an interception plate 125 and support plates 121 and 124 that are installed at both ends of the interception plate 125. The interception plate 125 is positioned under the vent member 39, and the support plates 121 and 124 are connected from both ends of the interception plate 125 to the lower gasket 26 and are fixed to the interception plate 125 at the center of a width direction of the interception plate 125.

The support plates 121 and 124 are installed to be substantially perpendicular to the interception plate 125, and at a lower part of the electrolyte injection opening 27, the support plates 121 and 124 have an electrolyte escape portion 123 that is bent to contact a wall surface of the case 34.

When the separation member 120 is installed in this way, the electrode assembly 10 can be prevented from significantly rising, and when the vent member 39 is opened, impurities such as the electrolyte can be stably prevented from being discharged through the vent member 39.

Figure 11:
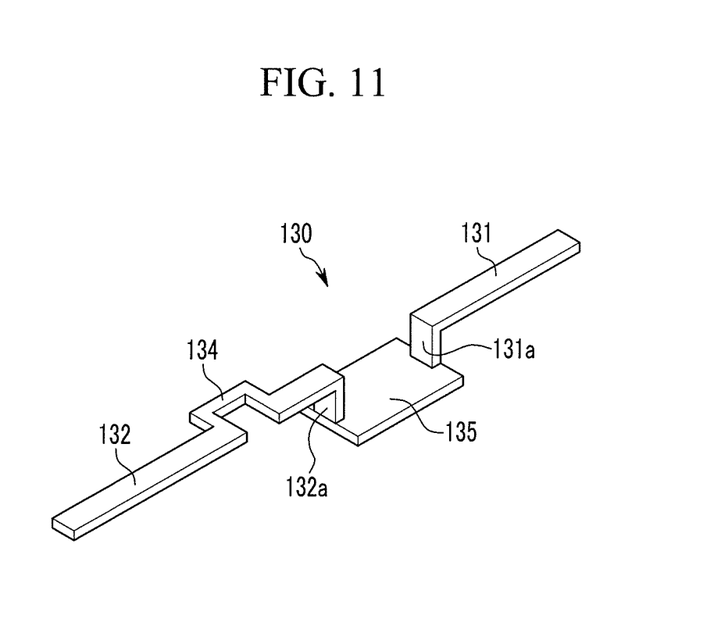
FIG. 11 is a perspective view illustrating a separation member of a rechargeable battery according to an eighth exemplary embodiment of the present invention.

FIG. 11 is a perspective view illustrating a separation member of a rechargeable battery according to an eighth exemplary embodiment of the present invention.

The rechargeable battery according to the present exemplary embodiment has substantially the same configuration as that of the rechargeable battery according to the first exemplary embodiment, except for a configuration of a separation member, and therefore a detailed description thereof will be omitted.

Referring to FIG. 11, a separation member 130 according to the present exemplary embodiment includes an interception plate 135 that is oriented substantially parallel to a cap plate 30, and support plates 131 and 132 that fix the interception plate 135 to a cap assembly.

The support plates 131 and 132 have bent portions 131a and 132a that are bent downward toward the interception plate 135 to separate the interception plate 135 from the cap plate 30. Further, the support plates 131 and 132 are connected toward the lower gasket 26 from the bent portions 131a and 132a. The support plates 131 and 132 that are positioned between the bent portions 131a and 132a and the lower gasket 26 are positioned to contact a lower surface of the cap plate 30. In the support plates 131 and 132, an electrolyte escape portion 134 that is bent so as not to interfere with injection of an electrolyte solution is formed to be generally aligned with the electrolyte injection opening 27.

When the separation member 130 is installed, as in the present exemplary embodiment, the electrode assembly 10 can be stably prevented from significantly rising and gas can be easily discharged to space between the cap plate 30 and the interception plate 135.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly comprising a positive electrode, a negative electrode, and a separator located between the positive electrode and the negative electrode;

a case housing the electrode assembly, the case having an opening;

a cap assembly comprising a cap plate coupled to the opening of the case, a vent member on the cap plate adapted to discharge a gas from the case, and at least one terminal protruding from the cap plate; and a separation member located between the electrode assembly and the cap plate to prevent the electrode assembly from significantly moving toward the cap plate, wherein the separation member comprises an interception plate generally aligned with the vent member, the interception plate having opposing planar surfaces connected by a lateral edge, and at least one support plate fixed to the interception plate and protruding from the interception plate in a first direction to separate the interception plate from the cap plate, wherein the interception plate is entirely continuous at all areas, wherein the at least one support plate extends past the lateral edge of the interception plate in a second direction perpendicular to the first direction, and wherein the separation member is entirely spaced from the at least one terminal.

2. The rechargeable battery of claim 1, wherein the interception plate contacts the electrode assembly.

3. The rechargeable battery of claim 1, wherein the interception plate is oriented substantially parallel to the cap plate.

4. The rechargeable battery of claim 1, wherein a longitudinal axis of the interception plate extends in a substantially parallel direction to a longitudinal axis of the cap plate, and wherein two support plates of the at least one support plate are attached at side edges of the interception plate such that the two support plates extend substantially parallel to each other.

5. The rechargeable battery of claim 1, wherein the interception plate has an escape groove positioned to be generally aligned with an electrolyte injection opening on the cap plate.

6. The rechargeable battery of claim 1, wherein the interception plate comprises a porous material.

7. The rechargeable battery of claim 1, wherein the support plate contacts the cap plate.

8. The rechargeable battery of claim 1, wherein the cap assembly comprises a lower gasket fixed to the at least one terminal, and wherein the separation member is attached to the lower gasket.

9. The rechargeable battery of claim 1, wherein the cap assembly comprises a lower gasket fixed to the at least one terminal, and wherein the separation member is integral with the lower gasket.

10. The rechargeable battery of claim 1, wherein the at least one terminal comprises two terminals each exposed to the outside and two lower gaskets, one of each of the lower gaskets fixed to a respective one of the terminals, and wherein the separation member is positioned between the two lower gaskets to be integral with the lower gaskets.

11. The rechargeable battery of claim 1, wherein the separation member has a bar shape, and wherein a central region of the separation member has a thickness greater than a thickness of a periphery thereof.

12. The rechargeable battery of claim 11, wherein the separation member has a bent vent escape portion generally aligned with the vent member so as to allow gas to pass therethrough.

13. The rechargeable battery of claim 11, wherein the separation member has a bent electrolyte escape portion generally aligned with an electrolyte injection opening on the cap plate so as to allow electrolyte to pass therethrough.

14. The rechargeable battery of claim 1, wherein the at least one support plate is fixed to ends of the interception plate, and wherein the at least one support plate has a bent portion bent toward the cap plate to separate the interception plate from the cap plate.

* * * * *